Feb. 21, 1967 N. A. POULOS 3,305,469
ELECTROCHEMICAL GAS ANALYZER
Filed Dec. 10, 1958
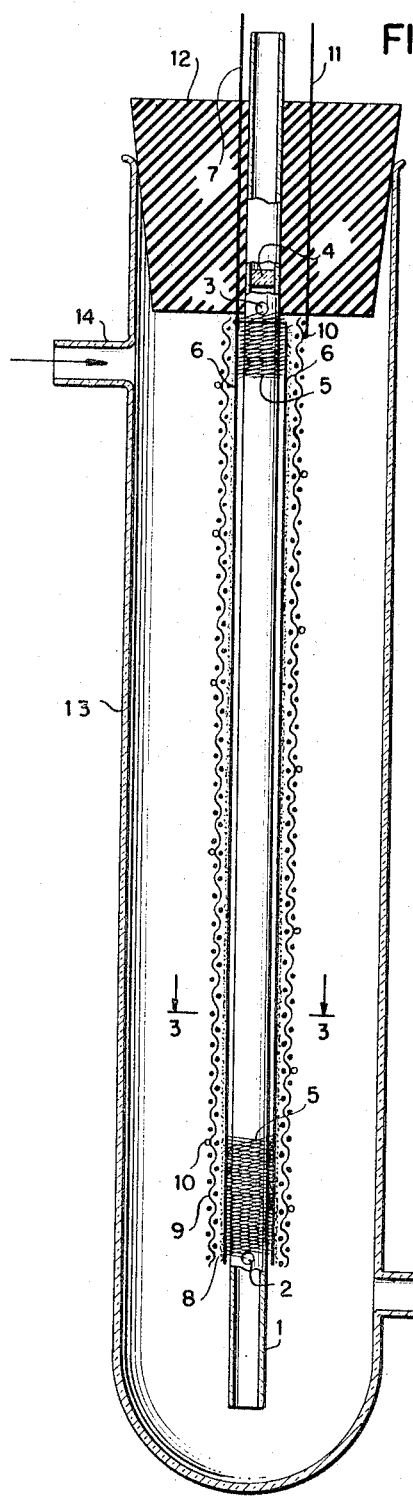
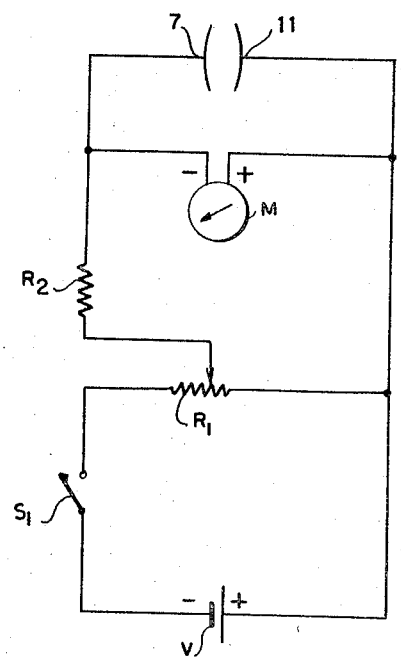
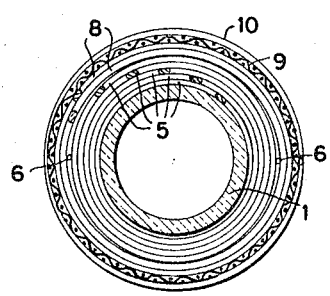
Nicholas A. Poulos
INVENTOR.
BY
Adams, Forward and McLean
ATTORNEYS United States Patent Office 3,305,469
Patented Feb. 21, 1967

3,305,469
ELECTROCHEMICAL GAS ANALYZER
Nicholas A. Poulos, Niagara Falls, N.Y., assignor to Olin Mathieson Chemical Corporation, a corporation of Virginia
Filed Dec. 10, 1958, Ser. No. 779,496
3 Claims. (Cl. 204—195)

This invention relates to a cell suitable for use in detecting and measuring small concentrations of gaseous boranes in air.

The manufacture and use of boranes such as diborane, pentaborane-9 and decaborane is becoming increasingly widespread. The boranes are toxic materials and recently the Conference of Governmental Industrial Hygienists has determined a maximum allowable concentration for eight hour day (M.A.C.) for some of the boranes. For example, the M.A.C. level for diborane is 0.1 p.p.m., for pentaborane-9 it is tentatively set at 0.01 p.p.m., and for decaborane, it is set at 0.05 p.p.m. The odor thresholds are 3 to 5 p.p.m. for diborane, 2-3 p.p.m. for pentaborane-9 and 0.035 for decaborane. The odor threshold for pentaborane-9 is so high compared to its M.A.C. level that pentaborane-9 constitutes a potential hazard without any warning. There is thus a need in the art for borane monitoring devices which detect and measure concentrations of boranes in air at levels at or below the M.A.C. levels. According to the present invention such a device is provided which, in addition to being extremely sensitive for all of the boranes, maintains its sensitivity during extensive periods of use and consistently indicates the concentration of boranes present within plus or minus twenty percent during such periods.

The cell of this invention suitable for use in detecting and measuring small concentrations of gaseous boranes in air includes a silver wire electrode coated with a paste consisting essentially of a silver salt and a homogeneous electrolyte solution, an adsorbent material wetter with the homogeneous electrolyte solution surrounding the coated silver wire electrode, and a platinum wire electrode surrounding the wetted absorbent material and separated thereby from the coated silver wire electrode.

The homogeneous electrolyte solution has for a solvent a mixture of water, a polyol having 2 to 6 carbon atoms and 2 to 6 hydroxyls, and a glycol ether of the formula RO—$(CH_2CH_2O)_n$—R', wherein $n$ is an integer from 2 to 4, R is an alkyl radical having 1 to 4 carbon atoms, and R' is hydrogen or an alkyl radical having 1 to 4 carbon atoms. The solute is an alkali metal salt. The electrolyte is advantageously prepared by dissolving the salt in water, admixing the so formed aqueous solution with the polyol, and adding the resulting admixture to the glycol ether.

The cell of this invention appears to depend for its effectiveness in large measure upon the use of the particular homogeneous electrolyte solution having the components described above. The homogeneous electrolyte solution is characterized by a very slow evaporation rate so that its composition remains substantially constant. The very slow evaporation rate is due in large measure to the substantial proportion of glycol ether in the electrolyte, generally 40 to 75 percent by volume of the solvent phase. The conductivity of the electrolyte is supplied by the aqueous salt solution while the function of the polyol is as a mutual solvent for the aqueous salt solution and the glycol ether. The proportion of water is hence generally 5 to 30 percent by volume of the solvent phase and the proportion of polyol is generally 20 to 35 percent by volume of the solvent phase. The solute generally constitutes from about 1 to 6% by weight of the final electrolyte solution.

A typical cell of this invention is depicted in FIGURE 1 of the accompanying drawing and a typical electrical circuit incorporating the cell is shown in FIGURE 2. FIGURE 3 is a cross section along line 3—3 of FIGURE 1.

In FIGURE 1, numeral 1 indicates a length of 8 mm. Pyrex tubing 15 cm. long having two pairs of 2 mm. holes therein, 2 and 3, and containing a glass plug 4. The length of tubing 1 extending between holes 2 and 3 is wrapped with five layers of a #10 cotton thread, which wrapping is indicated as 5. A piece of 0.078" diameter silver wire 6 extends down each side of tube 1 and connects with terminal 7. The silver wire 6 is coated with a total of about 1.0 gram of a paste obtained by admixing 0.2 gram of silver hydroxide with about 1.0 cc. of a potassium carbonate solution obtained by dissolving 7.5 grams of potassium carbonate in 200 ml. of water, admixing the resulting solution with 200 ml. of propylene glycol, and adding the resulting admixture to 400 ml. of the dimethyl ether of tetraethylene glycol. In the resulting homogeneous solution, the solvent is 6.6% by volume water, 33.3% by volume propylene glycol, and 60% by volume of the dimethyl ether of tetraethylene glycol, and the concentration of potassium carbonate is about 2% by weight of the final solution. The coated wire 6 extending along each side of tube 1 is wrapped with two layers of a #10 cotton thread, which wrapping is indicated as 8. A piece of platinum gauze 9 of 52 mesh and 0.008" diameter about 4.5 by 1.5 inches surrounds wrapping 8 and is tightly trussed with 0.078" platinum wire 10 connected with terminal 11. The platinum wire 10 is soldered at one or more points to platinum gauze 9 to insure a good electrical connection. This assembly is then dipped in the potassium carbonate solution described above and inserted into the hole in neoprene stopper 12 which in turn is inserted into pyrex tube 13 having gas inlet opening 14 and gas outlet opening 15.

The above cell assembly was employed in detecting the presence of boranes in air as described in the following examples.

EXAMPLE I

The electrode terminals 7 and 11 were connected across a 1.5 volt battery, terminal 11 being connected to the positive side, until the potential of the cell without applied voltage approached zero. It has been found that this "conditioning" period can be eliminated by the use of silver carbonate to form the paste coating silver wire 6. Apparently during the conditioning period, some of the silver hydroxide is converted to silver carbonate. Hence silver carbonate is preferred in forming the paste when potassium carbonate is the solute of the electrolyte.

The electrode terminals 7 and 11 were than connected to the detection circuit shown in FIGURE 2, including 0-100 microampere D.C. meter, M; 0-10,000 ohm wire wound potentiometer, $R_1$; 20,000 to 30,000 ohm, one-fourth watt carbon resistor, $R_2$; toggle switch, $S_1$, and a 7.5 volt battery, V. Toggle switch $S_1$ was closed and the resistances $R_1$ and $R_2$ were adjusted to give a reading of 100 microamperes on meter M. A warm-up period of about five minutes was sufficient to give a steady reading. Clean air was then drawn through gas inlet 14 at a rate of about 5 liters per minute and the reading remained steady. To insure that the air is clean, a small cartridge containing activated charcoal can be placed over gas inlet 14.

A sample of air containing 0.5 part per million of diborane was prepared by admixing diborane in nitrogen with clean air. This sample was then drawn through gas inlet 14 at a rate of about 5 liters per minute for about 2 minutes and gave a deflection of 80-100 microamperes on meter M. Clean air was then substituted for the contaminated sample and the contaminated sample was flushed from the system. The meter reading returned to normal in about 10 minutes.

EXAMPLE II

A sample of air containing 1.0 part per million of pentaborane-9 was prepared by admixing pentaborane-9 in nitrogen with clean air. This sample was then drawn through gas inlet 14 at a rate of about 5 liters per minute for about 2 minutes and gave a deflection of 8–10 microamperes on meter M. Clean air was then substituted for the contaminated sample and the contaminated sample was flushed from the system. The meter reading returned to normal in about 10 minutes.

EXAMPLE III

A sample of air containing 0.3 part per million of decaborane was prepared by passing a stream of clean air over a small amount of decaborane. This sample was then drawn through gas inlet 14 at a rate of about 5 liters per minute for about 2 minutes and gave a deflection of 12–15 microamperes on meter M. Clean air was then substituted for the contaminated sample and the contaminated air was flushed from the system. The meter reading returned to normal in about one-half hour. It has been found that the addition of small amounts of boric acid or glycine to the electrolyte solution, i.e. about one-half of one percent by volume, increases the rate of recovery to a normal reading in the case of decaborane.

This difference in recovery time after exposure to diborane and pentaborane-9 on the one hand and decaborane on the other hand, however, permits estimation of the relative proportion of decaborane in the total borane contaminant in the air. The diborane and/or pentaborane contribution to the meter reading will be about 80% removed in the first five minutes of recovery time after exposure while the decaborane contribution will remain practically unchanged.

EXAMPLE IV

A sample of air containing 1.0 part per million of propylpentaborane-9 was prepared by admixing propylpentaborane-9 in nitrogen with clean air. The propylpentaborane-9 was prepared by the method described in Chiras et al. application Serial No. 425,328, filed April 23, 1954. This sample was then drawn through gas inlet 14 at a rate of about 5 liters per minute for about 2 minutes and gave a deflection of 8–10 microamperes on meter M. Clean air was then substituted for the contaminated sample and the contaminated sample was flushed from the system. The meter reading returned to normal in about 10 minutes.

EXAMPLE V

A sample of air containing 0.3 part per million of ethyldecaborane was prepared by admixing ethyldecaborane with clean air. The ethyldecaborane was prepared by the method described in Altwicker et al. application Serial No. 497,407, filed March 28, 1955, now U.S. Patent No. 2,999,117. This sample was then drawn through gas inlet 14 at a rate of about 5 liters per minute for about 2 minutes and gave a deflection of 12–15 microamperes on meter M. Clean air was then substituted for the contaminated sample and the contaminated air was flushed from the system. The meter reading returned to normal in about 30 minutes. It has been found that the addition of small amounts of boric acid or glycine to the electrolyte solution, i.e. about one-half of one percent by volume also increases the rate of recovery to a normal reading in the case of ethyldecaborane.

EXAMPLE VI

Gas inlet 14 was placed near the top of an open bottle containing hydrazine hydrate and the pointer of the instrument went off scale indicating that the cell is extremely sensitive to hydrazine.

In other tests it was found that the cell was not sensitive to air containing 5 p.p.m. of sulfur dioxide, air containing 50 p.p.m. of carbon monoxide, and air containing 200 p.p.m. of ammonia. The cell is sensitive to chlorine, calcium hypochlorite dusts, ozone and other strongly oxidizing and reducing substances.

The cell described above and utilized in the specific examples can be modified in several respects. For example, in place of silver hydroxide, silver carbonate or silver chloride can be used, the anion of the silver salt however, generally corresponding to the anion of the alkali metal salt employed in the electrolyte.

Instead of the cotton thread separating the electrodes, any absorbent material such as paper, cloth and the like can be used.

In preparing the electrolyte, any salt which can be solubilized in the water-polyol-ether solvent can be employed. The alkali metal carbonates and alkali metal halides have been found to be readily solubilized in the solvent combination to give a homogeneous electrolyte. The use of potassium carbonate as a solute has been found to be especially effective in providing unusually stable electrolytes having sensitivity toward the whole spectrum of boranes. The use of potassium chloride as a solute, on the other hand, has been found to be preferentially sensitive to pentaborane, and an electrolyte containing potassium chloride as the solute, with or without an organic acid buffer, can be used in providing a monitoring device where pentaborane is the most toxic material present.

Also in preparing the electrolyte, any polyol completely miscible with water under ordinary conditions can be used. Such polyols include, ethylene, propylene and butylene glycols, trimethylene glycols, di- and triethylene glycols, dipropylene glycol, hexylene glycol, glycerol, threitol, pentaerythritol, ribitol, L-arabitol, sorbitol, L-iditol and D-talitol.

The glycol ethers which can be used in preparing the electrolyte include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether triethylene glycol monoethyl ether, tetraethylene glycol monobutyl ether, ethylene glycol diethyl ether, ethylene glycol dimethyl ether, ethylene glycol di-n-butyl ether, diethylene glycol dimethyl ether, diethylene glycol diethyl ether, triethylene glycol dimethyl ether, triethylene glycol di-n-butyl ether, tetraethylene glycol dimethyl ether, tetraethylene glycol diethyl ether and the like.

Examples of electroylte formulations which have been prepared and tested in the cell with good results are given below in Table I.

TABLE I

|  | A | B | C | D | E |
|---|---|---|---|---|---|
| Water, ml | 5 | 100 | 200 | 200 | 100 |
| Propylene Glycol, ml | 25 | 100 | 200 | 200 |  |
| Ethylene Glycol, ml |  |  |  |  | 200 |
| Dimethyl ether of tetraethylene glycol, ml | 45 | 200 | 400 | 400 |  |
| Cellosolve, ml |  |  |  |  | 200 |
| $K_2CO_3$, gms | 1 |  | 7.5 | 7.5 | 8 |
| KCl, gms |  | 4 |  |  |  |
| Citric Acid, gms |  | 8 |  |  |  |
| Boric Acid, gms |  |  |  | 4 |  |
| Glycine, gms |  |  | 4 |  |  |

An attempt was made to prepare an electrolyte without using any polyol as follows: 15 grams of potassium carbonate was dissolved in 100 ml. of water and the resulting solution was admixed with 200 ml. of the dimethyl ether of tetraethylene glycol. The admixture separated into two layers and could not be made homogeneous.

An electrolyte was prepared by dissolving 25 grams of potassium carbonate in 100 ml. of water and the resulting solution was admixed with 400 ml. of ethylene glycol.

The solution was homogeneous but when incorporated in the cell and tested in the manner described in Example II, the cell showed very poor sensitivity to pentaborane-9 although it was sensitive to diborane and decaborane. A similar electrolyte in which propylene glycol was substituted for the ethylene glycol similarly showed very poor sensitivity to pentaborane-9.

The potassium carbonate electrolyte is sensitive to large quantities of carbon dioxide in air. It is also sensitive to strong acid fumes such as hydrochloric acid gas. Thus where relatively large concentrations of carbon dioxide or strong acid fumes are present or expected to be present in the gas to be analyzed for boranes, the use in the electroylte of an alkali metal halide buffered with an organic acid gives more accurate readings. Instead of the citric acid employed in the formulation of electrolyte B of Table I, other acids having a relatively high vapor pressure can be employed such as benzoic acid, oxalic acid, tartaric acid, phthalic acid and the like. Preferably di- and tricarboxylic acids having up to 6 carbon atoms are used. The ratio of organic acid to alkali metal salt generally employed is about .5 to 1.5:1.

The detecting cell of this invention shown in FIGURE 1 can be modified to provide a gravity fed continuous supply of fresh electrolyte to the absorbent material. With such a modification, the recovery to normal readings of the michoammeter after exposure to air contaminated with decaborane takes about ten minutes.

Also, the circuit of FIGURE 2 can include automatic recording and/or alarm devices to give a continuous record of the borane concentration in air, for example, in laboratories or industrial locations, and/or to give warning when a predetermined concentration of borane in air has been reached.

As in conventional practice, the meter M of FIGURE 2 can be replaced by substituting therefor a D.C. amplifier, preferably a transistorized amplifier, which will include the meter across its output, thus providing greater sensitivity.

I claim:
1. A cell suitable for use in detecting and measuring small concentrations of gaseous boranes in air which comprises a silver wire electrode coated with a paste consisting essentially of a silver salt and an electrolyte solution, a non-conducting absorbent material wetted with the electrolyte solution surrounding the coated silver wire electrode, and a platinum wire electrode surrounding the wetted absorbent material, the electrolyte being a homogeneous solution wherein the solvent is a mixture of water, a polyol having 2 to 6 carbon atoms and 2 to 6 hydroxyls, and a glycol ether of the formula

$$RO-(CH_2CH_2O)_n-R'$$

wherein $n$ is an integer from 2 to 4, R is an alkyl hydrocarbon radical having 1 to 4 carbon atoms, and R' is selected from the class consisting of hydrogen and an alkyl hydrocarbon radical having 1 to 4 carbon atoms, and wherein the solute is an alkali metal salt.

2. The cell of claim 1 wherein the silver salt is silver carbonate and the homogeneous electrolyte is a potassium carbonate solution in water, propylene glycol and the dimethyl ether of tetraethylene glycol.

3. The cell of claim 1 wherein the silver salt is silver chloride and the homogeneous electrolyte is a potassium chloride solution in water, propylene glycol and the dimethyl ether of tetraethylene glycol containing a small amount of an organic acid.

References Cited by the Examiner
UNITED STATES PATENTS

| | | | |
|---|---|---|---|
| 1,513,558 | 10/1924 | Parker | 204—1 |
| 2,607,718 | 8/1952 | Suthard. | |
| 2,612,538 | 9/1952 | Cahoon et al. | |
| 2,870,067 | 1/1959 | Baker et al. | 204—1 |

HOWARD S. WILLIAMS, *Primary Examiner.*

ROGER L. CAMPBELL, *Examiner.*

R. EPSTEIN, T. TUNG, *Assistant Examiners.*